Figure 1:
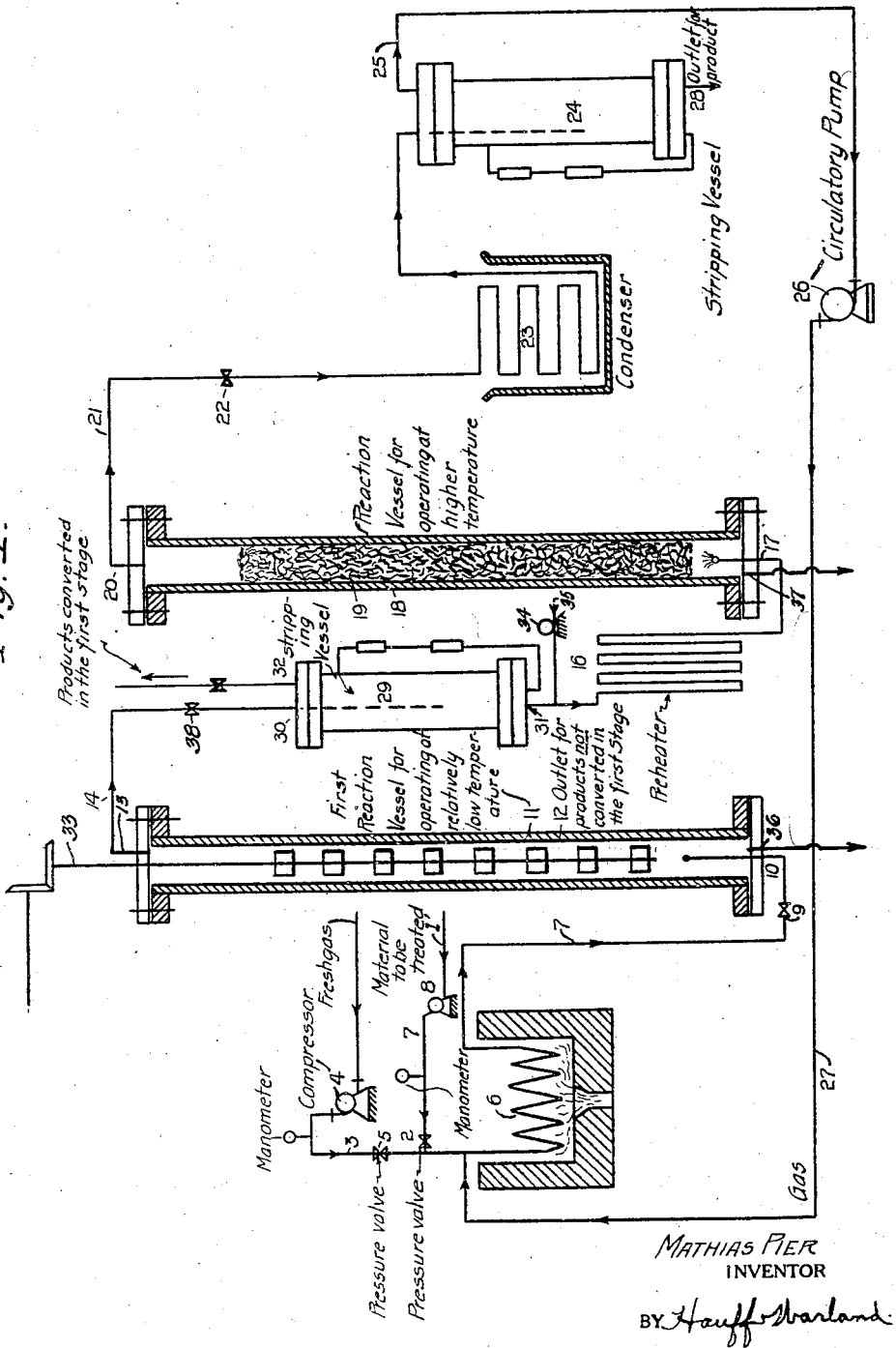

Patented Aug. 8, 1933

UNITED STATES PATENT OFFICE 1,921,477

PRODUCTION OF VALUABLE HYDROCARBONS

Mathias Pier, Heidelberg, Germany, assignor, by mesne assignments, to Standard-I. G. Company, Linden, N. J., a Corporation of Delaware Application July 25, 1929, Serial No. 381,072, and in Germany November 24, 1927

6 Claims. (Cl. 196—53)

The present invention relates to improvements in the manufacture and production of valuable hydrocarbons and in particular those of low boiling point range by destructive hydrogenation of carbonaceous materials.

The successful carrying out of the destructive hydrogenation of hydrocarbon products, such as substances of the nature of coal, tars, mineral oils and the like, for the production of valuable hydrocarbons and in particular those of low boiling point range, is very largely dependent on maintaining the working conditions as constant as possible. The reaction in question being very sensitive to temperature, a good and sufficient regulation of the temperature is above all essential. Irregularities in temperature lead to waste by the formation of coke and gas. Different temperatures are favourable for various components of the initial materials. On this account it has been usual to first produce products of a narrow boiling point range and then to treat these further under quite definite conditions. Or the initial material to be treated was subjected to a gradually increasing temperature in order to bring the different constituents to the temperature necessary for their reaction. This method of working is, however, not always suitable, since the heat tones are different at different temperatures, and undesirable excessive local heating would occur which would bring into question the favourable carrying out of the entire reaction.

I have now found that it is advantageous to carry out the process, hereinbefore referred to, in such a manner that the initial materials are treated in several stages, by subjecting the constituents which are not affected or not appreciably affected by the first treatment to a treatment by themselves under conditions more vigorous than those employed in the first stage of the destructive hydrogenation. This may be effected for example by carrying out the conversion of the not substantially affected constituents at a higher temperature than that employed in the first stage of the destructive hydrogenation. Accordingly not the whole of the product obtained by the first treatment is subjected to a repeated treatment at a higher temperature, but the initial materials are subjected to treatment at a definite temperature, preferably as low as possible, owing to which only a part of the materials is converted into valuable liquid substances. The unchanged remainder is separated and partly, or wholly, subjected to treatment with hydrogen at a higher temperature than in the first stage of the treatment. Distinct fractions may also be separated off before the further treatment at the higher temperature and may be worked up in another way, for example for the preparation of lubricating oils and the like. In the first stage it is preferable to employ a higher velocity of throughput. Thus, for example, if in the first stage a rate of flow of 1 cubic meter of the initial carbonaceous material per hour and per cubic meter of reaction space be employed, in the second stage a rate of flow of 0.6 cubic meter of carbonaceous material per hour and per cubic meter of reaction space may be employed. The height of the temperature employed in the second stage depends on the nature of the initial materials, on the conditions in the first treatment and on the nature of the products which are desired; thus for example, if mainly aromatic compounds are desired, temperatures of 500° centigrade or more are employed, and if the temperature in the first stage is rather high, the temperature in the second stage must be correspondingly higher.

In some cases, well defined end-products may be obtained by the employment of further stages with still higher temperatures. In the final stage at relatively high temperature, it is preferable to employ the materials in the form of vapour, and in this manner aromatic hydrocarbons may chiefly be obtained, if desired.

Catalysts may be added in the separate stages, if desired, and preferably such are employed as are immune to sulphur poisoning, and which have been referred to for example in the co-pending application Ser. No. 299,125 filed August 11th, 1925. In particular such comprising metals from the sixth group of the periodic system or compounds thereof, or such containing compounds of sulphur or of nitrogen are suitable.

The pressure may be varied within wide limits. Thus, atmospheric pressure may be employed, at least in some of the stages of the process, but better results are obtained as a rule by employing higher pressures of, for example, 20, 50, 100 atmospheres, and in order to obtain an even more thorough destructive hydrogenation, pressures of 200, 500, 1000 atmospheres or still more will often prove advantageous.

As examples of other intensified conditions which may be employed in addition to or instead of the increased temperature in the second or subsequent stages in order to convert the non-affected or not appreciably affected constituents into valuable substances, an increase in the pressure or an increase in the excess of hydrogen with a simultaneous reduction in the partial pressure of the materials to be treated may be mentioned. In some cases, it is also suitable to employ another catalyst in the subsequent stages more active than that employed in the first stage of the process, or to lengthen the duration of the treatment, for example by increasing the velocity of flow of the hydrogenating gases, relative to that of the carbonaceous materials, or also if desired, by a slow passage through the reaction vessel of the entire reaction materials.

By such variations, it is possible to treat the non-affected or not appreciably affected constituents according to their individual nature, and to choose the conditions of the subsequent stages so that a conversion or further conversion to the greatest possible extent is ensured in the subsequent stages. Thus, for example, if mineral oils be employed as the initial material an initial temperature of about 400° centigrade may prove very advantageous, and the treatment in the consecutive stage may be carried out for example at 50, 100 and 200 atmospheres respectively. If, however, pit coal be employed, more strenuous conditions may often be of advantage, thus for example an initial temperature of about 450° to 500° centigrade and pressures in the consecutive stages of 100, 200 and 1000 atmospheres respectively.

Moreover it has been found that it is frequently suitable, both when the intensification of the conditions has been effected by an increase in temperature or by some other means, to employ other chemical or physical treatments which are hereinafter referred to for the sake of brevity as other conversion treatments between the separate stages, such as by partially or wholly subjecting the materials to be further treated before their entry into the subsequent stage for example to an oxidation which may be carried out by blowing an air current through the material under treatment at an elevated temperature, or condensation for example with the aid of aluminium chloride, or to extraction by means of solvents such as heavy benzine, and, if desired, under pressure or distillation, or to a treatment in the electric arc, or with a high frequency discharge. In this manner it is possible to remove the constitutents, which can be converted into useful products according to different methods than by destructive hydrogenation, before the further hydrogenation, and then if desired to work them up either by themselves or in admixture with other constituents which have already been destructively hydrogenated and have been treated in the same manner, or to convert them by the intermediate treatment into a condition which favours or facilitates their further hydrogenation.

The operation is preferably carried out in the absence of materials which cause injurious reactions such as the formation of methane and the separation of coke.

The present invention will be further illustrated with reference to the accompanying drawings which show in diagrammatic fashion in Figures 1 and 2 side elevations partly in section of apparatus specially suitable for carrying out the process according to the present invention.

Referring to Fig. 1 of the drawings in detail, fresh hydrogenating gas is introduced into the system by way of the compressor 4 past a manometer through the pressure valve 5 by way of the pipe 3. Carbonaceous material to be treated is also introduced into said pipe 3 by a branch line 1, provided with a manometer, with the aid of pump 8 and through the pressure valve 2. The mixture of carbonaceous material and hydrogenating gas under pressure is preheated in the pressure resisting fire coil 6 and is introduced by way of pipe 7 and valve 9 at inlet 10 into a high pressure reaction vessel 11 in which a catalyst 12 is rigidly arranged on a stirring device 33. The conversion in this vessel may be carried out either so that the whole vessel is filled with liquid matter through which the hydrogenation gases pass and that at the top (13) of the vessel a mixture of hydrogenating gas, of vapors of converted hydrocarbons and of unconverted liquid hydrocarbon products leaves through pipe 14, which, if desired, after being partly or wholly released from pressure by valve 38, is separated in the stripping vessel 29, or, as shown in the drawings, so that a level of liquid is maintained in vessel 11 and that converted as well as the unconverted products are driven out in the vaporized state at the top 13 and separated in the stripping vessel 29 which at the same time may serve as condenser. In both cases any sludge and ashes formed may be withdrawn at 36. Vessel 11 is kept at a relatively low temperature. From the stripping vessel 29 the converted reaction products are removed by way of the pipe 32. Those portions of the carbonaceous materials which are not substantially affected in the first reaction vessel are removed from the stripping vessel at 31 and passed through the preheater 16 and by way of the inlet 17 into a second high pressure reaction vessel 18, in which substantially higher temperatures are maintained than in the first reaction vessel and which is filled with a catalyst 19. The hydrogen necessary for this second stage treatment is supplied at 35 and introduced into the said preheater 16 by means of compressor 34. At the higher temperature maintained in the vessel 18, the treated products are kept substantially in the vapor phase. Any sludge-like unvaporizable products collecting at the bottom of this vessel may be withdrawn at 37. The converted products leave the reaction vessel 18 at 20 and pass by way of pipe 21 and valve 22 into the condenser 23, and thence into the stripping vessel 24, where the liquid products are separated from the vaporous products. The liquid products collected in the stripping vessel 24 may be withdrawn at outlet 28. The vapors may be withdrawn through pipe 25 and returned to the process by way of circulatory pump 26 and pipe 27.

Figure 2:
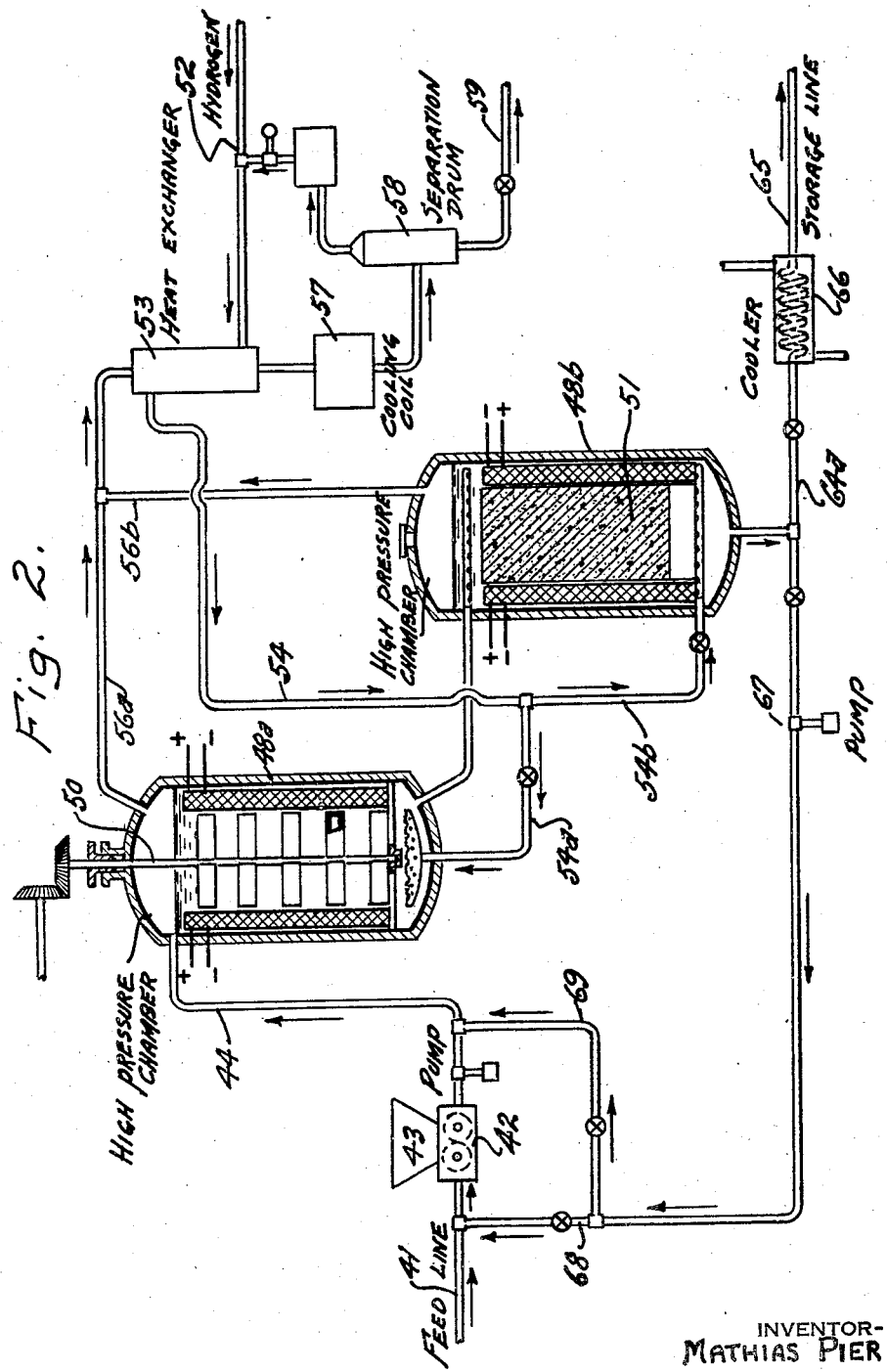

Fig. 2 of the drawings discloses a modified form of the apparatus which may be utilized for the treatment of solid carbonaceous material as is described in Example 2 of the specification. According to this figure hydrocarbon oil is withdrawn from any suitable source (not shown) by a line 41 and is forced through a grinding mechanism 42 which is fitted with the hopper 43 for the introduction of solid material such as pit coal and the like. The pump 45 forces this mixture through line 44 into the first high pressure vessel 48a. This vessel is fitted with a stirring mechanism 50 which is coated with a catalytic material. A heavy sludgelike material is withdrawn from the base of the vessel 48a and is continuously discharged into the second high pressure vessel 48b. Said heavy sludgelike material contains the unconverted parent material. The reaction vessel 48b is suitably packed with a solid catalytic material 51. Hydrogen is forced under high pressure from the line 52 through a heat exchanger 53 and by line 54 and branches 54a and 54b into vessels 48a and 48b respectively. Vaporized products and gas are removed from both vessels by the vapor lines 56a and 56b respectively. Said lines discharge through a single exchanger 53 to condenser 57. The light oil is separated from the gases in the separator 58 from which the oil is removed by 59 and from which the gases may be removed, purified and recompressed. Heavy oil may be continuously withdrawn from the vessel 48b and a part or the whole thereof may be continuously discharged through a line 64a, cooler 66 and conducted by line 65 to a suitable storage. If desired part of this oil may be circulated to line 41 or to line 44 by means of recirculation line 64b, pump 67 and either of the two lines 68 or 69 as is desired.

The following examples will further illustrate how the said invention may be carried out in practice but the invention is not restricted to these examples.

Example 1

A topped American crude oil, containing about 80 per cent of a non-distillable residue, no appreciable quantity of constituents boiling below 350° centigrade, and about 10 per cent boiling up to about 450° centigrade, is introduced by means of a pump in a hot state into high pressure apparatus and treated with hydrogen in the presence of a tungsten catalyst at 400° centigrade and 200 atmospheres pressure. About 20 per cent of the oil is thereby converted into benzine and light middle oil which is continuously removed from the apparatus in the form of vapour. The residue left behind is transferred to a second high pressure reaction vessel and treated with hydrogen at 450° centigrade and 200 atmospheres pressure in the presence of a catalyst containing molybdenum and chromium. In this way a further 50 per cent of the original product is converted into benzine and middle oil, which is removed in the form of vapour. The 30 per cent or so which remain, and of which the greater part boils up to 325° centigrade, is atomized in a third high pressure reaction vessel and passed in the form of vapour together with hot hydrogen at 460° centigrade over a catalyst containing molybdenum and zinc. About 70 to 80 per cent is thus converted into benzine. The residue remaining is of the nature of middle oil and may be employed as illuminating oil.

In the manner hereindescribed it is possible to utilize practically 100 per cent of the initial materials without any such troubles, for example, as coking occurring.

If the entire product had been treated in one stage, the low boiling constituents would have readily given rise to the formation of gaseous hydrocarbons and the high boiling constituents to the formation of coke.

The products obtained from the first and second stages, after removal of the fraction boiling below 200° centigrade may be further worked up alone, or may be added directly to the third stage. According to the product, the last stage is preferably carried out with lower pressures, whereby an increase in the low boiling benzine fraction is obtained.

Example 2

Pit coal is triturated with its own weight of oil of high boiling point range, containing practically no constituents boiling below 350° centigrade, and the mixture is treated in a high pressure reaction vessel at about 400° centigrade and under a pressure of 200 atmospheres with hydrogen, a stirrer being arranged in the said vessel on which a catalyst containing molybdenum is disposed on a lattice work. After having first separated off the products of low boiling point range, such as benzine, and the middle oils, the sludge-like contents of the reaction vessel are treated in a second reaction vessel with hydrogen at a temperature of about from 450° to 470° centigrade in the presence of a catalyst containing cobalt sulphide. According to this manner of working, 75 per cent of the coal are converted, without the formation of coke, into valuable oils, from which besides benzine and middle oils, valuable intermediate products are also obtained for the production of lubricating oils. If the same coal were treated at from 450° to 470° centigrade, the reaction would not proceed so completely and very considerable loss would occur owing to the formation of gases. Besides this, the middle oil obtained according to the process can be more easily converted into benzine.

Example 3

A heavy American oil which remains as a residue when the constituents of a mineral oil boiling up to 350° centigrade have been distilled off and which contains practically no constituents which boil below 350° centigrade, is treated with hydrogen at 200 atmospheres and at about 450° centigrade in the presence of a catalyst containing molybdenum and zinc. In this manner with a high throughput about 60 per cent of the oil introduced is converted into benzine and middle oil which are continuously removed as vapours together with the gas. The residue remaining, which has a very high boiling point and which is rich in asphalt, is subjected to the action of hydrogen at 1000 atmospheres and at 460° centigrade in the presence of a catalyst containing molybdenum, chromium and manganese in a second reaction vessel. Similarly in this manner with a high throughput a product is obtained of which practically 90 percent boils up to 350° centigrade.

If the entire material were to be treated in one stage at constant pressure the high molecular product rich in asphalt would be obtained in greater quantities and the velocity of throughput would therefore have to be considerably decreased.

This is a continuation-in-part of the application for patent Ser. No. 319,739 filed November 15th, 1928.

What I claim is:

1. A process for the production of gasoline hydrocarbons from a hydrocarbon product of a higher boiling point which comprises subjecting said hydrocarbon product to destructive hydrogenation in several stages, the first stage being effected under mild destructive hydrogenation conditions and for such a short duration of treatment that only a partial destructive hydrogenation into low boiling hydrocarbons ensues, part of the parent material remaining substantially unchanged, separating the low boiling hydrocarbons so produced and then destructively hydrogenating the substantially unchanged parent material in subsequent stages in which at least one of the conditions selected from the class consisting of temperature, pressure, partial hydrogen pressure, catalyst and time of contact of the reacting materials is more rigorous than in the first stage in order to effect complete conversion of the parent material into valuable low boiling end products.

2. The process as defined in claim 1 in which the subsequent stages are carried out at a higher temperature than the first stage.

3. The process as defined in claim 1 in which the last stage is effected in the vapor phase.

4. The process as defined in claim 1 in which the parent material is a mineral oil.

5. The process as defined in claim 1 in which the first stage is carried out at a temperature of 400° C. and a pressure of 200 atmospheres, the final stage at a temperature of about 460° C. and an intermediate stage at a temperature of 450° C. and a pressure of 200 atmospheres.

6. The process as defined in claim 1 in which the first stage is effected at a temperature of 400° C. and a pressure of 200 atmospheres in the presence of a tungsten catalyst, the final stage at a temperature of 460° C. in the vapor phase in the presence of a catalyst containing molybdenum and zinc and an intermediate stage at a temperature of 450° C. and a pressure of 200 atmospheres in the presence of a catalyst containing molybdenum and chromium.

MATHIAS PIER.